July 12, 1960

F. L. MOSELEY 2,944,866

GRAPHICAL RECORDERS

Filed March 11, 1957

INVENTOR.
FRANCIS L. MOSELEY

BY Robert H. Fraser

ATTORNEY

United States Patent Office 2,944,866
Patented July 12, 1960

2,944,866
GRAPHICAL RECORDERS
Francis L. Moseley, Pasadena, Calif., assignor to F. L. Moseley Co., a corporation of California
Filed Mar. 11, 1957, Ser. No. 645,338
7 Claims. (Cl. 346—8)

This invention relates to graphical recorders and more particularly to an improved graphical recorder tracing mechanism for positioning a member in accordance with the relationship between two variable quantities.

In graphical recorders, servo systems are frequently employed to position a tracing element, such as a pen or curve follower, relative to a recording medium. A graphical recorder servo system may receive an input signal representing a variable quantity which is applied to a balancing circuit in which a balancing voltage is opposed to the input signal. The balancing voltage may be generated in accordance with the position of the tracing element so that when the position of the tracing element corresponds to the input signal, the input signal and the balancing voltage are substantially balanced, i.e. equal and opposite. Upon a change in the input signal, applied to the servo system, an error signal is generated corresponding to the difference between the balancing signal and the input signal, and the tracing element is re-positioned in accordance with the error signal until the element is located in a position corresponding to the value of the input signal and a state of balance is achieved in the input circuit.

In recorders which are adapted to graphically reproduce the relationship between two variables, the tracing element may be moved in a first direction along one axis under the control of a servo system which follows a first input signal representing one variable quantity and in a second direction along an axis transverse of the first direction under the control of a servo system which follows a second input signal representing the other variable quantity.

Since the tracing element in a graphical recorder of the type described above is independently positionable in two directions, an independent drive system must be provided for each axis. In one arrangement, the tracing element is movable along the length of a carriage in one direction and the carriage is movable longitudinally in a direction transverse of the direction of movement of the marking element along the carriage. The carriage itself may be positioned relatively easily through a system of cables or belts from a stationary drive motor. However, positioning the tracing element along the length of the carriage from a stationary drive motor independently of the position of the carriage has heretofore been difficult.

In one system, the tracing element is positioned along the carriage through a sheave on the carriage which is linked to a splined shaft in such a way that the carriage is free to travel along the length of the splined shaft with the sheave being linked to the splined shaft for rotational movement only. A detailed description of a drive system employing a splined shaft may be found in the co-pending United States patent application Serial No. 495,405, filed March 21, 1955, now abandoned, in the name of Francis L. Moseley and entitled Tracing Mechanisms.

A difficulty involved in the use of the aforementioned sheave and splined shaft system has arisen from the fact that the splined shaft must be machined and mounted with a high degree of precision to allow the carriage to be freely movable along the shaft. Alignment between the sheave and splined shaft is critical, thereby requiring that the carriage be driven from both ends to preserve the alignment and to prevent binding. Even a slight imperfection in the splined shaft or misalignment of the sheave with the shaft has resulted in unsatisfactory operation.

Accordingly, it is an object of the present invention to provide a simple and effective system for positioning a graphical recorder tracing element which avoids the difficulties mentioned above.

It is an additional object of the present invention to provide a graphical recorder drive system in which a tracing element may be transported from stationary drive motors.

It is still another object of the present invention to provide a new and improved mechanical linkage by means of which a tracing element of a graphical recorder may be transported on a movable carriage from a stationary drive motor.

A better understanding of the invention may be had from a reading of the following detailed description and an inspection of the drawing, in which.

Figure 1:
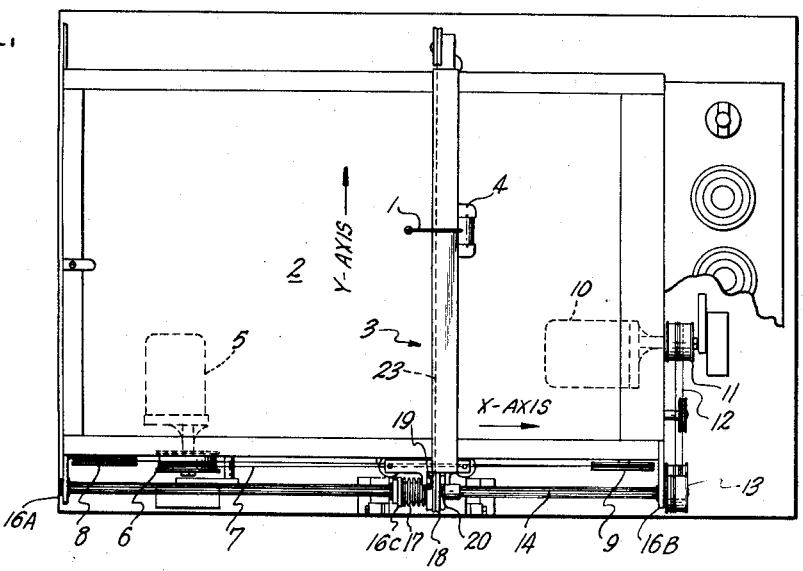
Fig. 1 is a top view partially broken away of a graphical recorder including an illustrative embodiment of the invention.

In the graphical recorder of Fig. 1, a tracing element comprising a pen 1 is movable over the surface of a bed 2. The pen 1 is supported by a carriage 3. By movement of the carriage 3, the pen 1 is positioned along the X-axis of the recorder, and by movement of a pen plate 4 along the carriage 3, the pen 1 is positioned along the Y-axis of the recorder.

The carriage 3 is positioned along the bed 1 of the X-axis of the recorder from a drive motor 5 which is supported beneath the bed 2 and is illustrated in phantom in Fig. 1. The X-axis drive motor 5 drives a capstan 6 around which a cable 7 is wound several times. The cable 7 is strung around a pair of idler pulleys 8 and 9 which are fastened to the frame of the recorder. The ends of the cable 7 are attached to the carriage 3. In operation, the carriage 3 is moved longitudinally of the recorder via the capstan 6 and the cable 7 when the X-axis drive motor 5 is energized.

The pen 1 is positioned along the Y-axis of the recorder from a Y-axis drive motor 10 which is supported beneath the bed 2 and is illustrated in phantom in Fig. 1. The Y-axis drive motor 10 is connected to a capstan 11 around which a cable 12 is wound several times. The cable 12 links the capstan 11 to a drive sheave 13 also around which the cable 12 is wound several times. The drive sheave 13 is attached to a splined shaft 14 which extends along the X-axis of the recorder throughout the travel of the carriage 3 and is journaled in the brackets 16A and 16B. When the Y-axis drive motor 10 is energized, the capstan 11, cable 12 and sheave 13 cause the splined shaft 14 to rotate.

Figure 4:
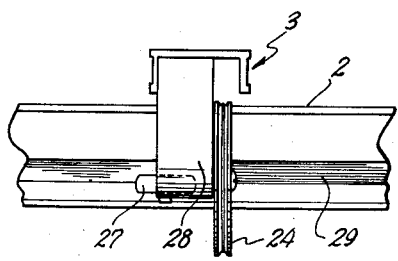
Fig. 4 is an enlarged rear view of a portion of the graphical recorder of Fig. 1.
Figure 2:
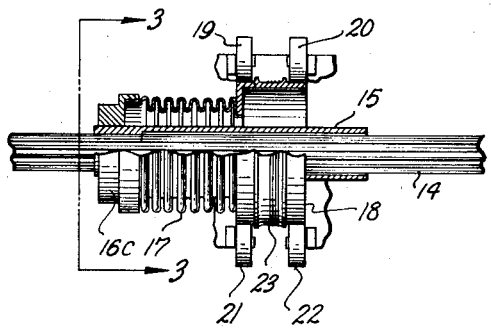
Fig. 2 is an enlarged front view partially broken away of a portion of the graphical recorder of Fig. 1.
Figure 3:
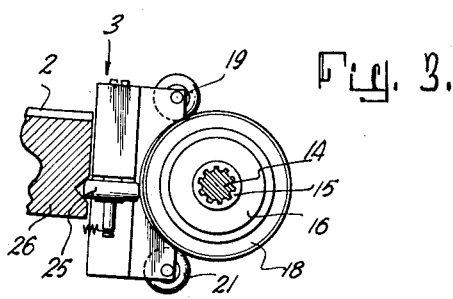
Fig. 3 is a sectional view of a portion of the graphical recorder of Fig. 1 taken along line 3—3.

In Fig. 2 there is shown a portion of the linkage between the pen plate 4 and the splined shaft 14. Surrounding the splined shaft 14 is a member 15 which includes internal convolutions or splines which match the shape of the splined shaft 14 (Fig. 3). The member 15 is adapted to slide along the length of the splined shaft 14 with a minimum of friction and to rotate with the splined shaft 14. A drive ring 16C is attached to the member 15, and a flexible coupling comprising a resilient cylindrical metal bellows 17 is attached at one end to the drive ring 16C. The other end of the bellows 17 is attached to a cable sheave 18. The cable sheave 18 rides on four rollers 19, 20, 21 and 22 which are attached to the carriage 3. A cable 23 is wound several times around the cable sheave 18 and is strung around an idler pulley 24 at the rear of the recorder (Fig. 4). The ends of the cable 23 are attached to the pen plate 4. By tightening the cable 4 the cable sheave 18 is held in engagement with the four rollers 19, 20, 21 and 22 and is supported in fixed relationship to the carriage 3. The bellows 17 provides a flexible coupling between the cable sheave 18 and the drive ring 16C so that the cable sheave 18 is free to slide along the splined shaft 14 irrespective of any irregularities in the splined shaft 14 or misalignment of the carriage 3 and cable sheave 18.

At the front of the recorder adjacent the splined shaft 14 (Fig. 3) the carriage 3 is supported by a roller 25 which engages a track 26 in the frame of the recorder.

Due to the improved linkage described above, the carriage 3 need only be driven at one end from the cable 7 for travel along the X-axis of the recorder. In addition, since the alignment of the carriage 3 and the splined shaft 14 is relatively less critical due to the improved linkage, a simple arrangement for supporting the carriage 3 at the rear of the recorder may be employed as illustrated in Fig. 4, in which a roller 27 and a bracket 28 support the carriage 3 by engaging a track 29 mounted beneath the bed 2.

With the simplified carriage drive system and less critical alignment and machining advantages provided by the invention, a substantial improvement has been achieved in the reliability and operation of graphical recorders of the type described. Notwithstanding the value of the invention in improving a graphical recorder of the type illustrated, it will be appreciated that changes, modifications and substitutions of equivalents may be made to adapt the invention to other uses without departing from the scope of the invention.

What is claimed is:

1. In a graphical recorder, the combination of a carriage which is adapted to be moved along the length of the recorder in a first given direction, a tracing element which is supported by the carriage and adapted to be moved in a direction transverse of the first given direction, a first drive motor, means linking the first drive motor to the carriage for transporting the carriage in said first given direction, a splined shaft mounted on the recorder along the length of travel of the carriage, an internally splined member engaging the splined shaft which is slideably movable longitudinally of the shaft and which is linked to the shaft for rotational movement, a sheave concentrically disposed around the splined shaft and supported by the carriage, a flexible coupling fastened between the internally splined member and the sheave, a cable wound around the sheave maintaining the sheave in position for support by the carriage and attached to the tracing element, and a second drive motor linked to the splined shaft so that the tracing element may be transported along the length of the carriage through a linkage comprising the splined shaft, the internally splined member, the flexible coupling, the sheave, and the cable when the second drive motor is energized.

2. Apparatus in accordance with claim 1 in which the flexible coupling comprises a bellows which concentrically surrounds a portion of the splined shaft between the internally splined member and the sheave.

3. In a graphical recorder, the combination of a carriage which is adapted to be moved along the length of the recorder in a first given direction, a tracing element which is supported by the carriage and adapted to be moved in a direction transverse of the first given direction, a splined shaft mounted on the recorder along the length of travel of the carriage, a tube having an internal configuration complementing the shape of the splined shaft which is supported by the splined shaft and adapted to rotate therewith, a sheave concentrically disposed around the splined shaft and supported by the carriage, a flexible coupling between the tube and the sheave, cable means linking the sheave to the tracing element and maintaining the sheave in position for support by the carriage, means rotating the splined shaft so that the tracing element may be transported along the length of the carriage through a linkage comprising the splined shaft, the tube, the flexible coupling, the sheave and the cable means, and means linked to the carriage for transporting the tracing element along the length of the recorder in said first given direction.

4. Apparatus in accordance with claim 3 in which the flexible coupling comprises a substantially cylindrical bellows which concentrically surrounds a portion of the splined shaft between the tube and the sheave.

5. In a graphical recorder, the combination of a carriage which is adapted to be moved along the length of the recorder in a first given direction, a tracing element which is supported by the carriage and adapted to be moved in a direction transverse of the first given direction, a first drive motor, means linking the first drive motor to the carriage for transporting the carriage in said first given direction, a splined shaft mounted on the recorder along the length of travel of the carriage, a tube having an internal configuration complementing the shape of the splined shaft supported by the splined shaft, said tube being adapted to slide along the length of the splined shaft and to rotate therewith, a sheave concentrically disposed around the splined shaft and supported by the carriage, a drive cable linking the sheave and the tracing element, a plurality of rollers on the carriage against which the sheave is adapted to ride, a flexible coupling between the tube and the sheave, and a second drive motor linked to the splined shaft whereby the tracing element may be transported along the length of the carriage through a linkage comprising the splined shaft, the tube, the flexible coupling, the sheave, and the drive cable when the second drive motor is energized.

6. Apparatus in accordance with claim 5 in which the flexible coupling comprises a hollow substantially cylindrical bellows which concentrically surrounds a portion of the splined shaft between the tube and the sheave.

7. In a graphical recorder the combination of a bed for receiving a record medium, a carriage supported for movement along the length of the bed, a pen supported for movement along the length of the carriage in a direction transverse of the direction of movement of the carriage along the bed, a splined shaft mounted adjacent the bed along the transverse of the carriage, a tube having an internal configuration complementing the shape of the splined shaft supported by the splined shaft, said tube being adapted to slide along the length of the splined shaft and to rotate therewith, a plurality of rollers fastened to the carriage adjacent the splined shaft, a sheave concentrically surrounding a portion of the splined shaft and engaging the rollers, a drive cable linking the sheave to the pen, said drive cable being adapted to maintain the sheave in engagement with the rollers, a drive ring secured to the tube for rotational movement therewith, a hollow substantially cylindrical bellows surrounding a portion of the splined shaft and fastened between the drive ring and the sheave for translating rotational movement of the tube into rotational movement of the sheave, a first drive motor linked to the carriage for positioning the carriage along the bed of the recorder, and a second drive motor linked to the splined shaft for positioning the pen along the length of the carriage.

References Cited in the file of this patent

UNITED STATES PATENTS

| | | |
|---|---|---|
| 1,582,284 | Leipert | Apr. 27, 1926 |
| 1,871,227 | Smith et al. | Aug. 9, 1932 |
| 2,224,182 | Crooke | Dec. 10, 1940 |
| 2,392,916 | Gruss | Jan. 15, 1946 |

FOREIGN PATENTS

| | | |
|---|---|---|
| 1,015,258 | France | Sept. 15, 1952 |

UNITED STATES PATENT OFFICE
CERTIFICATE OF CORRECTION

Patent No. 2,944,866                          July 12, 1960

Francis L. Moseley

It is hereby certified that error appears in the printed specification of the above numbered patent requiring correction and that the said Letters Patent should read as corrected below.

Column 4, line 47, for "transverse" read -- traverse --.

Signed and sealed this 13th day of December 1960.

(SEAL)
Attest:

KARL H. AXLINE
Attesting Officer

ROBERT C. WATSON
Commissioner of Patents